United States Patent [19]
Hire et al.

[11] Patent Number: 5,250,582
[45] Date of Patent: * Oct. 5, 1993

[54] PROCES FOR MAKING CELLULAR AND MICROCELLULAR POLYURETHANE FOAMS

[75] Inventors: Robert C. Hire, Dayville; Ronald S. Blackwell, Waterbury, both of Conn.

[73] Assignee: Olin Corporation, Cheshire, Conn.

[ * ] Notice: The portion of the term of this patent subsequent to Sep. 7, 2010 has been disclaimed.

[21] Appl. No.: 556,131

[22] Filed: Jul. 23, 1990

Related U.S. Application Data

[63] Continuation-in-part of Ser. No. 518,393, May 3, 1990.

[51] Int. Cl.$^5$ .............................................. C08G 18/00
[52] U.S. Cl. ................................... 521/157; 521/128; 521/130; 521/142; 521/155; 521/163; 521/170; 521/172
[58] Field of Search ............... 521/172, 118, 128, 157, 521/130, 142, 155, 163, 170; 524/591; 528/76, 77

[56] References Cited

U.S. PATENT DOCUMENTS

| | | | |
|---|---|---|---|
| 4,352,896 | 10/1982 | Kopp et al. | 521/118 |
| 4,417,002 | 11/1983 | Liessem | 521/128 |
| 4,460,738 | 7/1984 | Frentzel et al. | 524/591 |
| 4,521,615 | 6/1985 | Frentzel | 560/198 |
| 4,590,255 | 5/1986 | O'Connor et al. | 528/71 |
| 4,910,231 | 3/1990 | Pham et al. | 521/159 |

Primary Examiner—John Kight, III
Assistant Examiner—Duc Truong
Attorney, Agent, or Firm—Dale Lynn Carlson

[57] ABSTRACT

The present invention relates to a process for producing a cellular or microcellular polyurethane foam wherein the reactants provide a built-in blowing capability. The process is effected by reacting a polyisocyanate with a carboxy-modified polyol to form a polyurethane and carbon dioxide, said carbon dioxide acting as an in situ blowing agent to foam said polyurethane into a cellular or microcellular polyurethane foam. In another aspect, the present invention relates to a process for forming an integral skin cellular or microcellular polyurethane foam by reacting, in a closed mold, a polyisocyanate with a carboxy-modified polyol to form a polyurethane and carbon dioxide.

8 Claims, No Drawings

PROCES FOR MAKING CELLULAR AND MICROCELLULAR POLYURETHANE FOAMS

This is a continuation-in-part application of U S. patent application Ser. No. 518,393, filed May 3, 1990, now pending.

BACKGROUND OF THE INVENTION

Blowing agents for producing a cellular structure in polyurethane foams are typically added as a separate ingredient to the reactant package for fabricating the polyurethane. Water acts as a blowing agent by reacting with isocyanate to produce carbon dioxide and urea groups, this reaction is highly exothermic and is limited in its applicability in order to minimize the risk of foam scorch or fire.

Frequently, cellular and microcellular polyurethane foams are manufactured using chlorinated fluorocarbons (so-called "CFC's") as a blowing agent, alone or in combination with water, to blow the foam-forming reactants into the desired microcellular structure. Unfortunately, CFC's have recently come under attack for adversely affecting the ozone layer in the earth's atmosphere. As an alternative to the use of CFC's, so-called hydrogenated chlorinated fluorocarbons ("HCFC's") are being increasingly utilized in cellular and microcellular polyurethane foam manufacture. However, HCFC's are expensive and may also have some impact upon the earth's atmosphere. Accordingly, new alternatives to the use of CFC's and HCFC's as blowing agents for cellular and microcellular foams, particularly alternatives that are cheaper and do not adversely affect the environment, are highly desired by the polyurethane foam industry.

Various alternatives to the use of halocarbon blowing agents have been suggested in the past. By way of illustration, U.S. Pat. No. 4,417,002 discloses the use of carboxylic acid and salts of carboxylic acid as blowing agents for manufacturing polyurethane foam. Preferred blowing agents disclosed in the '002 patent include formic acid and salts of formic acid with weak organic bases such as hydrazine, triethylamine, dimethylbenzylamine and triethylenediamine. The '002 patent states that each mole of formic acid is converted, by virtue of its reaction with isocyanate, to one mole of carbon dioxide gas and one mole of carbon monoxide gas, with blowing being accomplished by means of these two gases. Although the use of carboxylic acids in accordance with the '002 patent is an alternative to the use of halocarbon blowing agents, the carboxylic acid does constitute a separate component in the reaction mixture.

As an alternative to the use of blowing agents which are separate components being added either to the reaction mixture or, more frequently, to the polyol-side of the reaction mixture, it would be highly desirable to provide reactants with built-in blowing capability. Heretofore, reactants possessing such built-in blowing capability have not been known, based upon the knowledge of the present inventors.

SUMMARY OF THE INVENTION

In one aspect, the present invention relates to a process for producing a cellular or microcellular polyurethane foam wherein the reactants provide a built-in blowing capability, said process being effected by reacting a polyisocyanate with a carboxy-modified polyol to form a polyurethane, and optionally other isocyanate derivative products, and carbon dioxide, said carbon dioxide acting as an in situ blowing agent to foam said polyurethane into a cellular or microcellular polyurethane foam. The process is suitably carried out using the carbon dioxide thus generated as a sole blowing agent or in combination with supplemental blowing agents such as water and halocarbon blowing agent(s). The process is suitable for the production of flexible, rigid and semi-rigid polyurethane foams.

In another aspect, the present invention relates to a process for forming an integral skin cellular or microcellular polyurethane foam by reacting, in a closed mold, a polyisocyanate with a carboxy-modified polyol to form a polyurethane, and optionally other isocyanate derivative products, and carbon dioxide, said carbon dioxide acting as an in situ blowing agent to foam said polyurethane into an integral skin cellular or microcellular polyurethane foam. Particularly advantageous application is found in using the process of the present invention in the production of integral skin foams having a compact outer skin formed by foaming the reaction mixture in a closed mold.

In yet another aspect, the present invention relates to products produced by the above processes, including the microcellular polyurethane foam and the integral-skin microcellular polyurethane foam so produced.

These and other aspects will become apparent from a reading of the following detailed specification.

DETAILED DESCRIPTION OF THE INVENTION

The carboxy-modified polyols useful in the process of the present invention are known in the art and have been used in the past in the manufacture of polyurethane elastomers. These polyols and their method of preparation are described in U.S. Pat. Nos. 4,521,615; 4,590,255 and 4,460,738, the disclosures of which are incorporated herein by reference in their entirety.

The fact that foaming of the urethane formulation is provided in accordance with the present invention is particularly surprising in view of the finding by the present inventors that a mixture of unmodified polyol with fumaric acid does not provide carbon dioxide blowing in an isocyanate-containing polyurethane-forming reaction mixture under analogous reaction conditions to those utilized for blowing using the carboxy-modified polyols in accordance with the present invention.

A detailed description of the preparation of the carboxy-modified polyols useful as reactants in the present invention is presented below. While the present invention is not to be so limited, the preparation is believed to occur by a three-step mechanism, which is illustrated by the following Equations (I) through (X) wherein the monoether polyol or polyether polyol employed is represented by B; and the peroxy-type free radical initiator is represented by ROOR:

Initiation:

$$ROOR \rightarrow 2RO \cdot \qquad (I)$$

Propagation:

$$A + RO \cdot \rightarrow A \cdot + ROH \qquad (II)$$

$$A \cdot + B \rightarrow A - B \qquad (III)$$

$$A\cdot-B\cdot+A\to A-B+A\cdot \quad (IV)$$

$$A\cdot-B\cdot+ROOR\to A-B-OR+RO\cdot \quad (V)$$

$$A\cdot-B\cdot+ROH\to A-B+RO\cdot \quad (VI)$$

Termination:

$$2RO\cdot\to ROOR \quad (VII)$$

$$A\cdot+A\cdot\to A-A \quad (VIII)$$

$$AB\cdot+A\cdot\to A-B-A \quad (IX)$$

$$AB\cdot+AB\cdot\to ABBA \quad (X)$$

In the case where tripropyleneglycol (TPG) is the polyether polyol (A) employed, and either maleic acid (cis-HOOCCH═CHOOOH) or fumaric acid (trans-HOOOH═CHCOOH) are employed as the acid (B), Equations (II), (III), and (IV) would be written respectively as the equations (IIa), (IIIa) and (IVa) as shown below:

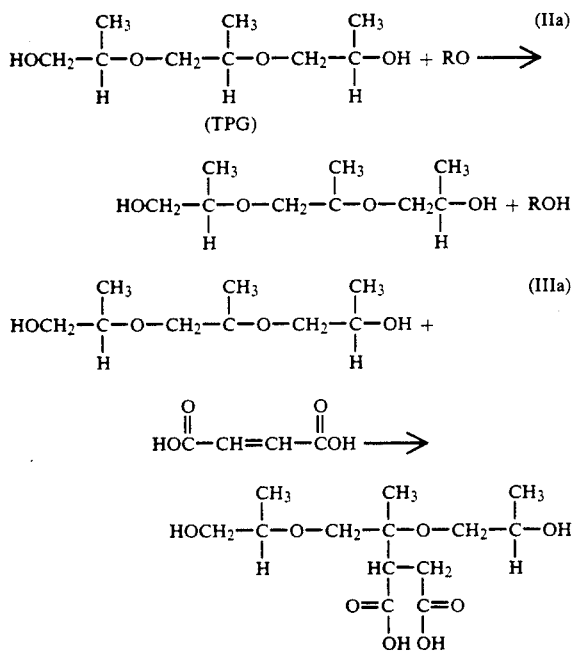

As can be seen in Equation (IIIa), above, the carboxylic acid replaces a hydrogen atom on a carbon adjacent to an oxygen atom in an ether linkage (C—O—C). With TPG as the polyether polyol, there are three other sites where it is believed the acid groups may replace a hydrogen. These are the other three carbons adjacent to an ether-oxygen atom. Thus it is possible in theory that individual carboxylic acid groups may attached to all four sites on TPG. In practice, it is believed that steric effects will prevent the attachment of that many acid groups on such a short polyether polyol. On much longer polyether polyols, it may be possible that many carboxylic acid groups will become attached.

Maleic acid, fumaric acid and itaconic acid [HOOCCH$_2$C(═CH$_2$)COOH] are preferred dicarboxylic acids, since they do not homopolymerize. Free radical addition reactions using these acids are carried out by removal of a hydrogen from another polyol or from another active hydrogen containing source. Maleic acid and fumaric acid or mixtures thereof are preferred due to cost considerations.

Suitable polyhydroxy-containing monoether and polyether compounds useful in the present invention include any compound which contains 2 or more hydroxyl groups and contains 1 or more ether linkages (C—O—C). The compounds are commonly called either monoether polyols or polyether polyols. The two or more hydroxyl groups are needed for reaction with polyisocyanates to form polyurethane prepolymers. The ether linkage is needed for the formation of a free radical on an adjacent carbon. See V. Malatesta and J. C. Scaiano, "Absolute Rate Constants for the Reactions of tert-Butoxyl with Ethers: Importance of the Stereoelectronic Effect" J. Org. Chem. 1982, 47, pages 1455-1459. Polyester polyols and other types of polyols which do not contain ether linkages could not be used for this reaction; but could be employed as supplemental polyols for reaction with polyisocyanates and the like.

In particular, suitable monoether polyols include diethylene glycol and dipropylene glycol. Because of their relatively short length, monoether polyols are usually not used alone, but rather in combination with polyether polyols.

Suitable polyether polyols include various polyoxyalkylene polyols having from 2 to 8 hydroxyl groups and mixtures thereof. These can be prepared, according to well-known methods, by condensing an alkylene oxide, or a mixture of alkylene oxides using random or step wise addition, with a polyhydric initiator or a mixture of polyhydric initiators. Illustrative alkylene oxides include ethylene oxide, propylene oxide, butylene oxide, amylene oxide, aralkylene oxides such as styrene oxide, and the halogenated alkylene oxides such as trichlorobutylene oxide, tetrahydrofuran, epichlorohydrin and the like. The most preferred alkylene oxides are ethylene oxide, propylene oxide or a mixture of these two oxides using random or step wise oxyalkylation.

The polyhydric initiator used in preparing the polyether polyol reactant includes the following and mixtures thereof (a) the aliphatic diols such as ethylene glycol, 1,3-propylene glycol, 1,2-propylene glycol, butylene glycols, butane diols, pentane diols, and the like; (b) the aliphatic triols such as glycerol, trimethylopropane, triethylolpropane, trimethylolhexane, and the like; (c) higher functionality alcohols such as sorbitol, pentaerythritol, methyl glucoside, and the like; (d) the polyamines such as tetraethylene diamine; and (e) the alkanolamines such as diethanolamine, triethanolamine, and the like.

A preferred group of polyhydric initiators for use in preparing the polyether polyol reactant is one which comprises aliphatic diols and triols such as ethylene glycol, propylene glycol, glycerol, trimethylopropane, and the like.

The alkylene oxide-polyhydric initiator condensation reaction is typically carried out in the presence of a base catalyst such as KOH as is well known in the art, or an acid catalyst or a so-called double metal cyanide complex catalyst. In effecting the reaction a sufficient proportion of alkylene oxide is used as to provide a polyol generally having an average molecular weight of between about 100 and about 30,000, preferably between about 200 and about 10,000, and more preferably about 300 and about 8,000. The catalyst is thereafter preferably removed or neutralized, particularly when a base catalyst is used, leaving a polyether polyol which is ready for use in preparing the hydroxyl-terminated prepolymer of the invention. Typical base catalysts include alkali metal hydroxides, alkaline earth metal hydroxides, alkali metal alkoxides, and combinations thereof, such as potassium hydroxide, sodium hydroxide, magnesium hydroxide, calcium hydroxide, sodium methoxide, potassium methoxide, sodium ethoxide, potassium ethoxide, and combinations thereof. The base catalyst is typically employed in an amount of between about 0.1% and about four percent by weight based upon the weight of the polyol-forming reaction mixture.

As an alternative to base catalysis in the production of the polyol, acid catalysts are suitably employed. Useful acid catalysts include Lewis acids, such as $BF_3Et_2O$ (boron trifluoride etherate), $SbF_5$ (antimony pentafluoride), $SbCl_5$ (antimony pentachloride), $F_3CSO_3H$ (trifluoromethane sulfonic acid), as well as protic acids such as $HBF_4$ (tetrafluoroboric acid), $H_2SO_4$ (sulfuric acid), and combinations thereof, and the like. The acid catalyst is typically employed in an amount of between about 0.01% and about two weight percent based upon the weight of the polyol-forming reaction mixture, preferably between about 50 and about 1,500 ppm in the reaction mixture. Exceeding the two percent upper limit of acid catalyst may result in undesirable side reactions.

Also useful in the preparation of polyols are double metal cyanide complex ("DMC") catalysts. The double metal cyanide complex catalysts suitable for use in the process of the present invention and their preparation are described in U.S. Pat. Nos. 4,472,560 and 4,477,589 to Shell Chemical Company and U.S. Pat. Nos. 3,941,849 and 4,335,188 to General Tire & Rubber Company. The teachings of the foregoing patents are incorporated herein by reference. The DMC catalyst is typically employed in an amount of between about 0.01% and about four weight percent based upon the weight of the polyol-forming reaction mixture.

One double metal cyanide complex catalyst found particularly suitable for use is a zinc hexacyanometallate of formula:

$Zn_3[M(CN)_6]_2 \cdot xZnCl_2 \cdot yGLYME \cdot zH_2O$ wherein M may be Co(III), or Cr(III) or Fe(II) or Fe(III); x, y, and z may be fractional numbers, integers, or zero and vary depending on the exact method of preparation of the complex, preferably independently being between 0 and 15.

The preferred polyether polyols are derived from diols, triols, and mixtures thereof. The most preferred polyether polyols for the present invention are polyoxyethylene diols and triols, polyoxypropylene diols and triols, block and random polyoxyethlylenepolyoxypropylene diols and triols and mixtures thereof. The polyols typically have a molecular weight of between about 300 and about 20,000 or higher, and molecular weights of 6,000 to 20,000 or higher are achievable using DMC catalysis.

It should be noted that the monoether and polyether polyol reactants of the present invention may be reacted with diacids or anhydrides to form polyester polyether polyols prior to the reaction with the carboxylic acid. Thus polyester polyether polyols would be formed having carboxylic acid groups individually spaced on the molecule.

Any free radical initiator may be employed in the preparation of the carboxy-modified polyol reactant useful in the present invention. Suitable initiators include conventional azo compounds such as AIBN, as well as peroxy-type initiators, with the latter being preferred. Typical peroxy-type free radical initiators include hydrogen peroxide and organo peroxides and hydroperoxides such as dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumene hydroperoxide, paramenthane hydroperoxide, dicetyl peroxide, dialphacumyl peroxide, dipropyl peroxide, diisopropyl peroxide, isopropyl-t-butyl peroxide, butyl-t-butyl peroxide, dilasroyl peroxide, difuroyl peroxide, ditriphenylmethyl peroxide, bis(p methoxybenzoyl) peroxide, p-monomethoxybenzoyl peroxide, rubrene peroxide, sacaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-decalin hydroperoxide, alpha-methylbenzyl hydroperoxide, alpha-methyl-alpha-methylbenzyl hydroperoxide, tetralin hydroperoxide, triphenylmethyl hydroperoxide, diphenylmethyl hydroperoxide, 2,5-di-methyl-2,5-bis(2 ethyl hexanoyl peroxy)hexane, 1,1-bis(t-butylperoxy)cyclohexane and t-butyl perbenzoate.

As stated above, the weight ratio of the total monoether polyol(s) and polyether polyol(s) employed to the unsaturated dicarboxylic acid in the preparation of the carboxy-modified polyol reactant should be from about 99:1 to about 70:30. When less than about 1 part by weight of the acid is used per about 99 parts of the polyol, the character of the polyol is not significantly changed. When more than about 30 parts by weight of the acid is employed per about 70 parts of the polyol, it is likely that a significant portion of the acid will not react onto the polyol because of absence of sufficient reactive sites. Preferably, the weight ratio is between about 93:7 and about 75:25.

Besides the selected reactants, peroxy-type initiators and weight ratios mentioned above, the other reaction conditions for preparing the carboxy-modified polyols not critical to the process of the present invention. It is preferred to carry out the reaction of the polyol and the dicarboxylic acid at a temperature from about 25° C. to about 150° C. More preferably, the reaction temperature is in the range from about 80° C. to about 130° C. The reaction temperature should be high enough to activate the peroxy-type free radical initiator for this reaction. In some cases, it may be desirable to add a free radical accelerator such as a Redox catalyst to speed up the reaction. The reaction time will depend mainly upon the reaction temperature used and suitable reaction times will range from about 30 minutes to 600 minutes. The reaction may be monitored by following the disappearance of the maleic, fumaric or itaconic acid in the reaction mixture with conventional analysis techniques.

Generally, this reaction is carried out without a solvent. However, in some cases, it may be desirable to employ a solvent. For example, if a very viscous polyether polyol is employed, it may be desirable to thin the reaction mixture with water or another solvent to facilitate the reaction.

The free-radical initiated reaction for preparing the carboxy-modified polyols useful in the present invention may be conducted under conditions known to be suitable for free-radical polymerizations. Super- or subatmospheric reaction pressure is not necessary for the present reaction. Atmospheric pressure is preferred in order to avoid the expense of special reaction vessels. The reaction is advantageously carried out by mixing the reactants, initiator(s), optionally with a free-radical accelerator(s) and solvent, at temperatures from about 25° C. to about 150° C. with an inert atmosphere (e.g. under a nitrogen blanket) until the reaction is complete. The initiator(s) and optional catalyst(s) and solvent may be added at the beginning of the reaction or may be added portion wise at intervals during the course of reaction.

The adducts produced by this reaction are generally water-insoluble, but they may be converted into water-dispersible form by reaction with a conventional neutralization agent (e.g. an inorganic or organic base) which converts some or all of the carboxylic acid groups into ionic groups according to well known methods.

Supplemental blowing agents optionally employed in accordance with the present invention in conjunction with the foam formulation blowing provided by the carbon dioxide generated from the carboxy-modified polyol include, for example, chlorofluorocarbons (so-called "CFCs"), hydrochlorofluorocarbons (so-called "HCFCs), water, and the like. If used, the supplemental blowing agent is utilized in a "blowing effective amount", i.e., and amount when combined with the primary (carbon dioxide) blowing agent, that is sufficient to provide the desired degree of blowing of the foam formulation. Preferably, the blowing agent employed is CFC-free.

Organic polyisocyanates useful as reactants in the present invention include any aromatic, cycloaliphatic and aliphatic diisocyanates and higher polyisocyanates. Diisocyanates are the preferred class of polyisocyanates. Suitable aliphatic diisocyanates include hexamethylene diisocyanate, 4,4'-dicyclohexylmethane diisocyanate; isophorone diisocyanate; 1,4-tetramethylene diisocyanate; and 1,10-decamethylene diisocyanate and 1,12-dodecamethylene diisocyanate. Suitable aromatic diisocyanates include toluene-2,4- or 2,6-diisocyanate; 1,5-naphthalene diisocyanate; 4-methoxy-1,3-phenylene diisocyanate; 4-chloro-1,3-phenylene diisocyanate; 2,4'-diisocyanatodiphenyl ether; 5,6-dimethyl-1,3-phenylene diisocyanate; 2,4-dimethyl-1,3-phenylene diisocyanate; 4,4'-diisocyanatodiphenylether; benzidine diisocyanate, 4,4'-diisocyanatodibenzyl; methylene-bis(4-phenylisocyanate); and 1,3-phenylene diisocyanate.

The reaction parameters for the polyurethane-forming reaction are not narrowly critical. Conventional additives such as hardeners, emulsifiers, dyes, leveling agents and the like may be added. Suitable external emulsifiers include both ionic emulsifiers such as alkali and ammonium salts of long-chain fatty acids or long-chain aryl(alkyl)sulfonic acids and non-ionic emulsifiers such as exthoxylated alkyl benzenes having an average molecular weight of from about 500 to 10,000.

The ratio of isocyanate (NCO) groups to hydroxy (OH) groups in the reactants is preferably in the range from about 0.5:1 to about 5:1, more preferably, in the range from about 1.1:1 to 2:1.

The preferred reaction temperature for the urethane reaction is from about 25° C. to about 150° C., preferably between about 25° C. and about 100° C.

In the polyurethane-forming reaction, it may be advantageous or desireable to add additional compounds which will react with the isocyanate groups. These additional compounds may include polyether polyols, polyester polyols, and other conventional compounds, such as amines, known to react with polyisocyanates to form polyurethanes and other isocyanate derivative products. Also, it may be desirable to add other conventional additives such as thickening agents, pH adjusters, monoisocyanates and the like.

Furthermore, fillers, plasticizers, pigments, and the like may be utilized as desired. It may be also desirable to add other polyurethane prepolymers made from modified or unmodified polyether polyols or polyester polyols or the like.

The following examples are given to further illustrate the present invention. All parts and percentages are by weight unless otherwise explicitly noted.

EXAMPLE 1

Production and Testing of Carboxy-Modified Polyols

Procedure (A)—Fumaric Acid Grafting of a Polyol and Preparation of Polyol Resin Formulations Fumaric acid grafted polyols were made utilizing an amount of fumaric sufficient to provide a theoretical 7% or a 15% by weight of acid graft in accordance with the following procedure presented for the 7% grafting:

A five liter, 3-neck flask was charged with 3200 grams of POLY-G 85-29, a polyether triol product of Olin Corporation having a molecular weight of about 6,000 and a hydroxyl number of 29. Also charged to the flask was 240.86 grams of fumaric acid. The mixture was heated to 140° C. A free radical initiator, tert-butyl peroxide, was added and the mixture was maintained at 140° C. for a period of twelve hours. The approximately 7% grafting reaction was complete as determined by a free fumaric acid level in the product mixture of less than 0.01%. Water was stripped out of the product mixture to a level of less than 0.06%. The 15% acid graft was performed using fumaric acid by an analogous procedure.

Polyol resin formulations were prepared as outlined in Table 1 below. The base polyol utilized was POLY-G 56-28 polyol, an alkoxypropylated polyether triol having a molecular weight of about 6,000 and a hydroxyl number of 28, which is a product of Olin Corporation. The base polyol and grafted polyol prepared as described above were formulated into a resin formulation as given in Table 1. The polyol resin formulation also contained ethylene glycol (EG) and diethylene glycol (DEG) in the specified amounts as foam processing additives. Two amine catalysts were also added, namely DABCO EG, an amine curing catalyst, and POLYCAT 77, and amine blowing catalyst, together with a silicone surfactant, namely DC-193, in the amounts specified in Table 1 under "Resin Ingredients".

Control formulations identical to the above formulations but without fumaric acid were also prepared as detailed in Table 1. The control formulations were prepared in a 1000 ml. disposable tri-pour beaker by charging ungrafted polyol, POLY-G 56-28 together with a premixed catalyst mixture of a one-to-one ratio of DABCO EG and POLYCAT 77 amine catalysts, together with the silicone surfactant DC-193. In addition to the control formulations, an analogous comparison formulation containing 15 weight percent added (but ungrafted) fumaric acid was prepared.

Procedure (B)—Production of Foams Using Fumaric Acid Grafted Polyols

In order to compare the acid-grafted polyols against the control formulations without fumaric acid and against the comparison formulation containing polyol plus added (but ungrafted) fumaric acid, foam specimens were made in accordance with the following procedure. Prior to foam formation, all formulations (both A-side and B-side) were allowed to equilibrate overnight in an oven set at 70° C. in order insure that the formulations have a controlled viscosity.

Free rise foam specimens were prepared by mixing the resin and catalyst in the amounts specified in Table 1 below in a 12 ounce waxed paper cup. While mixing with a PREMIER Series 2000 dispersator equipped with a "HI-VIS" mixing head at a speed of about 3,000 rpms., the isocyanate (ISONATE 181) was syringed into the cup and dispersed for about 5 to 10 seconds. Reaction and cure of the resulting foam took place in the same cup for Foam 1 and Foam 3 presented in Table 1. Foams 2 and 4 given in Table 1 were prepared in an analogous fashion to Foams 1 and 3, respectively, except that the weights of the foam formulation components were increased and, after mixing of the formulation components, foaming and curing of the foam were conducted in a fresh waxed paper cup.

The results presented in Table 1 indicate that excellent blowing of the foams is provided using the fumaric acid grafted polyols used in accordance with the present invention. In contrast, control formulations utilizing ungrafted polyol did not provide the desired blown foam. In addition, the comparison foam prepared at 70° C. using a foam formulation identical to Foam 1 except containing the ungrafted polyol (POLY-G 56-28) with 7% added fumaric acid did not provide acceptable blowing of the foam at either a 110 or 113 index formulation, instead providing a foam density of about 60 pcf as compared to a foam density of 23 pcf for Foam #1 using grafted polyols. This result indicates that only the grafted polyol within the scope of the present invention provides significant blowing of the foam.

TABLE 1

FOAM FORMULATION AND PROPERTIES

|  | Foam #1 | Foam #2 | Foam #3 | Foam #4 |
|---|---|---|---|---|
| Foam Formulations (in grams) | | | | |
| Isonate 181 Wt. | 27.20 | 54.60 | 27.00 | 34.10 |
| Resin "X" Wt. | 60.00 | 120.40 | — | — |
| Resin "Y" Wt. | — | — | 60.00 | 75.90 |
| Catalyst/ratio below (Dabco EG/Polycat 77 1:1) | 0.40 | 0.80 | 0.40 | 0.50 |
| OH Equiv Wt w/ catalyst | 446.5 | 446.5 | 450.4 | 450.4 |
| Index | 110 | 110 | 110 | 110 |
| Foam Properties | | | | |
| Foam Weight | 76.09 | 142.78 | 35.07 | 56.86 |
| Foam Density | 0.37 | 0.37 | 0.17 | 0.15 |
| Pounds/Cubic Foot (PCF) | 23.08 | 23.31 | 10.64 | 9.28 |
| Average PCF | 23.20 | | 9.96 | |
| Resin Ingredients (parts by weight) | Resin "X" | | Resin "Y" | |
| Poly-G 56-28 | 200.00 | | 200.00 | |
| Fumaric Acid Grafted Polyol (7% theoretical graft) | 200.00 | | — | |
| Fumaric Acid Grafted Polyol (15% theoretical graft) | — | | 200.00 | |
| DEG | 4.39 | | 4.39 | |
| EG | 21.20 | | 21.20 | |
| DABCO EG | — | | — | |
| POLYCAT 77 | — | | — | |
| DC-193 | 0.98 | | 0.98 | |
| Total Weight | 426.57 | | 426.57 | |
| OH Equiv Wt w/o Catalyst | 443.56 | | 447.41 | |

What is claimed is:

1. A process for producing a cellular or microcellular polyurethane foam wherein the reactants provide a built-in blowing capability, said process being effected by reacting a polyisocyanate with a carboxy-modified polyol, in the presence of a chlorofluorocarbon or hydrochlorofluorocarbon supplemental blowing agent, to form a polyurethane or other isocyanate derivative product and carbon dioxide, said carbon dioxide acting as an in situ blowing agent to foam said polyurethane into a cellular or microcellular polyurethane foam, said carboxy-modified polyol being a carboxylic acid grafted polyol which is the reaction product of a monoether polyol or polyether polyol and a carboxylic acid.

2. The process of claim 1 wherein said carboxylic acid is selected from the group consisting of fumaric acid, maleic acid, itaconic acid, and combinations thereof.

3. A process for forming an integral skin cellular or microcellular polyurethane foam by reacting, in a closed mold, a polyisocyanate with a carboxy-modified polyol, in the presence of a chlorofluorocarbon or hydrochlorofluorocarbon supplemental blowing agent, to form a polyurethane and carbon dioxide, said carbon dioxide acting as an in situ blowing agent to foam said polyurethane into an integral skin cellular or microcellular polyurethane foam, said carboxy-modified polyol being a carboxylic acid grafted polyol which is the reaction product of a monoether polyol or polyether polyol and a carboxylic acid.

4. The process of claim 3 wherein said carboxylic acid is selected from the group consisting of fumaric acid, maleic acid, itaconic acid, and combinations thereof.

5. The product produced by the process of claim 1.

6. The product produced by the process of claim 3.

7. The process of claim 1 which additionally employs a supplemental water blowing agent.

8. The process of claim 3 which additionally employs a supplemental water blowing agent.

* * * * *